United States Patent
McKinney

(10) Patent No.: US 8,715,492 B2
(45) Date of Patent: May 6, 2014

(54) FLUSH SYSTEM WITH CONTROLLED VOLUME

(76) Inventor: Jerry L. McKinney, Silsbee, TX (US)

( * ) Notice: Subject to any disclaimer, the term of this patent is extended or adjusted under 35 U.S.C. 154(b) by 464 days.

(21) Appl. No.: 13/086,047

(22) Filed: Apr. 13, 2011

(65) Prior Publication Data

US 2012/0261317 A1    Oct. 18, 2012

(51) Int. Cl.
*C02F 1/00* (2006.01)
*C02F 3/28* (2006.01)
*E03F 1/00* (2006.01)
*B01D 29/66* (2006.01)
*C02F 3/04* (2006.01)

(52) U.S. Cl.
CPC .......... *C02F 3/288* (2013.01); *C02F 3/046* (2013.01); *C02F 2303/16* (2013.01); *E03F 1/002* (2013.01); *B01D 29/66* (2013.01); *B01D 29/668* (2013.01)
USPC ............ 210/108; 210/170.08; 210/195.1; 210/258; 405/40

(58) Field of Classification Search
CPC ........................................ C02F 3/288
USPC ........................................ 210/170.08
See application file for complete search history.

(56) References Cited

U.S. PATENT DOCUMENTS

| | | | | |
|---|---|---|---|---|
| 4,986,905 A | * | 1/1991 | White | 210/104 |
| 5,200,065 A | * | 4/1993 | Sinclair et al. | 210/104 |
| 5,360,556 A | * | 11/1994 | Ball et al. | 210/804 |
| 5,670,038 A | * | 9/1997 | McKinney | 210/98 |
| 7,497,946 B2 | * | 3/2009 | Jessick et al. | 210/170.08 |
| 8,187,472 B1 | * | 5/2012 | Svetlik, III | 210/747.1 |
| 2009/0282976 A1 | * | 11/2009 | Ruskin | 95/151 |

* cited by examiner

*Primary Examiner* — Terry Cecil
(74) *Attorney, Agent, or Firm* — Bushman & Associates, P.C.

(57) ABSTRACT

An apparatus for use in a septic system such as an aerobic wastewater treatment plant connected to a drip irrigation system for dispensing wastewater from the septic system. The apparatus includes a pump having a pump outlet for a pumping treated wastewater from the septic system, a filter connected to the pump outlet, the filter having a first output for directing filtered water to the drip irrigation system and a second outlet for disposal of backwash water used to clean the filter. There is an accumulator or canister having a predetermined volume for receiving water from at least one of the drip irrigation systems and the second output of the filter. The accumulator has an outlet connected to a pressure actuated normally open flush valve, which closes in response to pressure from water in the accumulator and which moves to the normally open position when the pump is deactivated.

6 Claims, 4 Drawing Sheets

FLUSH SYSTEM WITH CONTROLLED VOLUME

BACKGROUND OF THE INVENTION

1. Field of the Invention

The present invention relates to septic systems; e.g., wastewater treatment systems and, more particularly, to an apparatus for use in septic systems connected to a drip irrigation system.

2. Description of Prior Art

Typically the treated water from a septic system; e.g., an aerobic wastewater treatment system (AWWS), is pumped from a pump or holding tank and into a drain field or drip irrigation system through a series of lines which are buried in the drain field, each of the lines having a series of drip emitters or small orifices which discharge small amounts of water from the lines into the drain field. These drip emitters/orifices are readily subject to plugging from solids carried over from the pump tank. To avoid this problem, it is common to use some type of filter system between the pump discharge and the manifold or header to the drip irrigation system. One such system is disclosed in U.S. Pat. No. 5,670,038 ('038 Patent), incorporated herein by reference for all purposes.

In a system marketed by Clearstream Wastewater Systems, Inc., a centrifugal action screen filter known as SPIN CLEAN® marketed by Agricultural Products, Inc. is employed to catch debris that would otherwise pass into the drip field piping and potentially plug the emitters/orifices.

Other types of filters, e.g., disc filters, sand filters, can also be employed between the pump from the pump tank and the piping in the drip or drain field to prevent the emitters/orifices from being plugged by solids carried over from the pump tank.

In all of the systems described above, it is necessary to flush the drip lines of the drip irrigation systems which is typically accomplished by temporarily pressurizing the lines and returning the water from the drip lines back to the pretreatment/trash tank or aerobic tank in an AWWS for further treatment. Since the flushing is carried out each time the pump is activated, it will be understood that a significant amount of water is being recycled to the AWWS. This return of a large volume of water into the system places an extra load on the system by increasing throughput through the system and requires a larger pump. Furthermore the return of this water back to the trash tank reduces the output of the pump in the pump tank as well as its pressure thereby decreasing the pump efficiency downstream, i.e., in the drip field. Further, in most prior art systems, there is semi-continuous backwashing or flushing of the filters when the pump is running meaning that, there is a further increase in the volume through the AWWS and compromised efficiency of the pump. Although the volume of recycle can be controlled with an electric solenoid valve, such a system involves electric power, timers, sensors, etc.

SUMMARY OF THE INVENTION

In one aspect, the present invention provides an apparatus which can be used in a septic system connected to a drip irrigation system for flushing drip lines in the drip irrigation system.

In another aspect, the present invention provides an apparatus for use in a septic system connected to a drip irrigation system which can control the amount of water used to backwash filters and clean drip lines in the drip irrigation system.

In yet another aspect, the present invention provides an apparatus for use in a septic system connected to a drip irrigation field for backflushing filters and cleaning drip lines in the drip irrigation field which minimizes the use of electrical components, such as solenoids.

DESCRIPTION OF THE PREFERRED EMBODIMENTS

Figure 1:
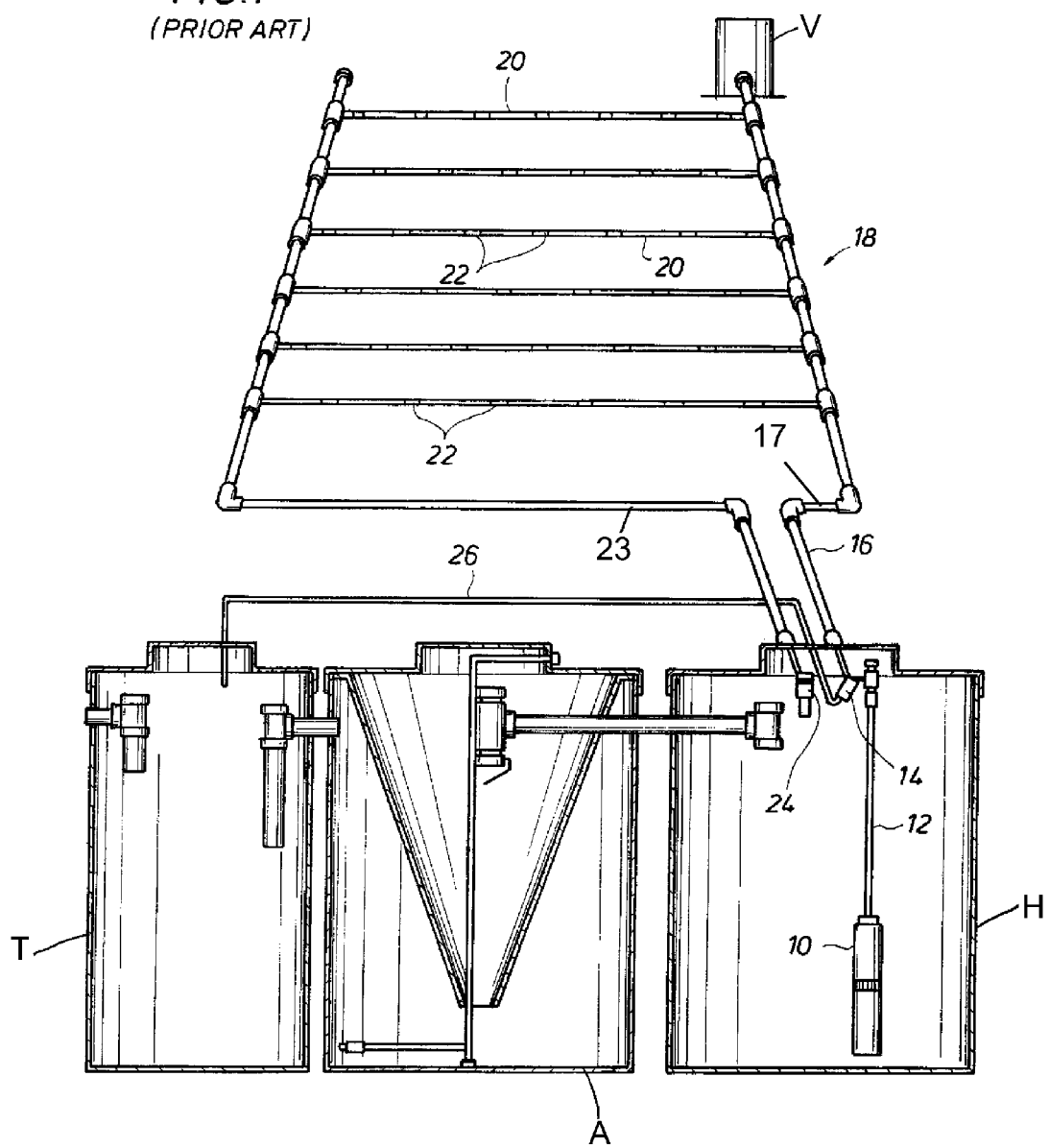
FIG. 1 is a schematic drawing of a prior art AWWS connected to a typical drip irrigation system.

Referring first to FIG. 1, there is shown a prior art system including an AWWS connected to a typical drip irrigation system. As is well known to those skilled in the art, a typical AWWS comprises a trash or a pre-treatment tank T for receipt of incoming wastewater, an aerobic treatment/clarifier tank A for aerobic digestion and clarification of wastewater received from pretreatment tank T and a pump or holding tank H for receiving aerobically treated, clarified water from tank A. Disposed in holding tank H is a pump 10, having an outlet line 12 which is connected to a filter 14 which, in one embodiment, can be a SPIN CLEAN® whose output in turn is connected to a header line 16, which in turn is connected to the inlet header 17 of a drip irrigation system shown generally as 18. As can be seen, the drip irrigation system 18 has a series of drip lines 20, each of which has a plurality of emitters/orifices 22 for slowly dispensing water into the drain field in which the drip irrigation system 18 is disposed. As is common, there is a vacuum breaker V connected to the drip irrigation systems 18.

In typical fashion, water passing through lines 20 is returned via an outlet footer 23, which in turn is connected to a return footer control assembly 24 well known to those skilled in the art, and which generally comprises a gauge and a ball valve or other type of valve, the purpose of which is to choke off the return flow so as to ensure a desired pressure in the lines 20 and, more specifically, to ensure that there is sufficient pressure in the lines 20 to clean the emitters 22, the returned water from control assembly 24 dumping into pump tank H.

Filter 14, in addition to having a first output connected to header 16 also has a second output connected to line 26, through which backwash water containing filtered debris is discharged into pre-treatment tank T at all times that pump 10 is activated. As is well known to those skilled in the art, pump 10 is actuated by a cycle timer (not shown), at periodic intervals which can vary widely but in any event results in substantial recycle of backwash water via line 26 to trash tank T.

As can be seen with this prior art arrangement, there is a large volume of water which, when pump 10 is running, is being returned to the front end of the AWWS; i.e., into tank T and into pump tank H. It is known that this volume can be reduced by means of electrically operated solenoid valve, manual control valves, etc., However, the use of manually controlled valves is inconvenient and suffers from inaccuracy while solenoid valves, being electrically powered, require electrical wiring which, to the extent possible, is to be minimized in septic systems particularly of the AWWS type.

Figure 3:
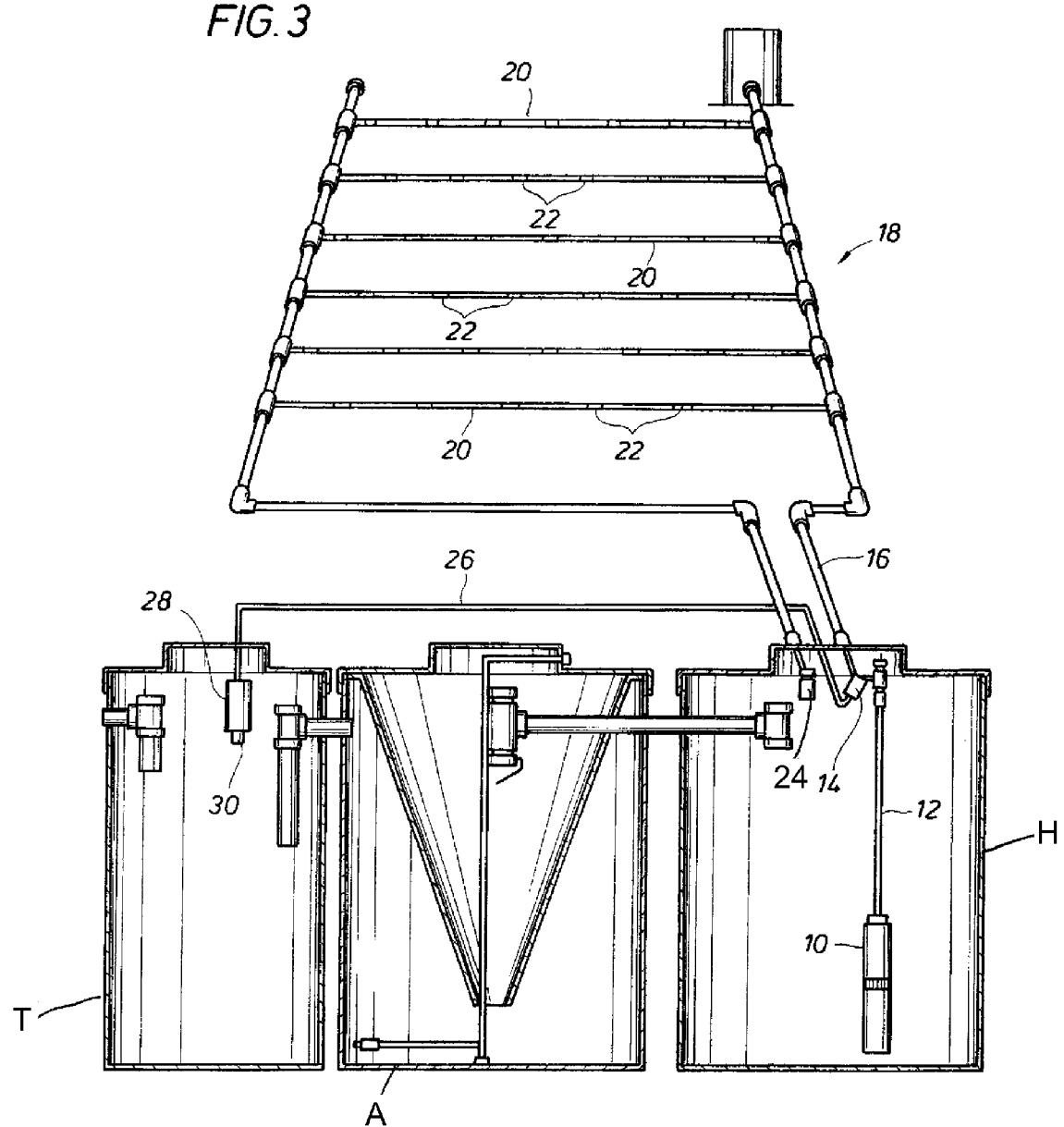
FIG. 3 is a view similar to FIG. 1 but showing another embodiment of the present invention.

Referring now to FIG. 3, there is shown one embodiment of the present invention. The embodiment shown in FIG. 3 differs from the prior art system shown in FIG. 1, in that rather than return line 26 from filter 14 returning backwash water directly to pretreatment tank T, the backwash water is sent to an adjustable or fixed volume flush canister or accumulator 28, which in turn has its output connected to a flush valve 30, both of which can be disposed in trash tank T.

In operation, when activation of pump 10 is initiated, washing of the filter 14 is also initiated and washing or backwash water, including trash from filter 14 passes through line 26 and into accumulator 28. Valve 30 is of the type that is normally open, until a pressure is applied to close the valve. Thus, so long as pump 10 is in operation, valve 30 will remain in a closed position with a predetermined amount of water being collected in accumulator 28. Once pump 10 is deactivated, the pressure built up by pump 10 in the accumulator 28 will be relieved and valve 30 will now move back to its normally open position and the predetermined amount of water collected in accumulator 28 will be allowed to drain into the trash tank T. Thus, rather than a large amount of water being used to back flush filter 14 when pump 10 is running, only the amount of water in accumulator 28 will be used, thereby greatly minimizing the throughput of water through the AWWS. Accumulator 28 can be of the fixed or adjustable volume type, but in any event will have a volume sufficient to ensure that filter 14 has been back flushed sufficiently.

Figure 2:
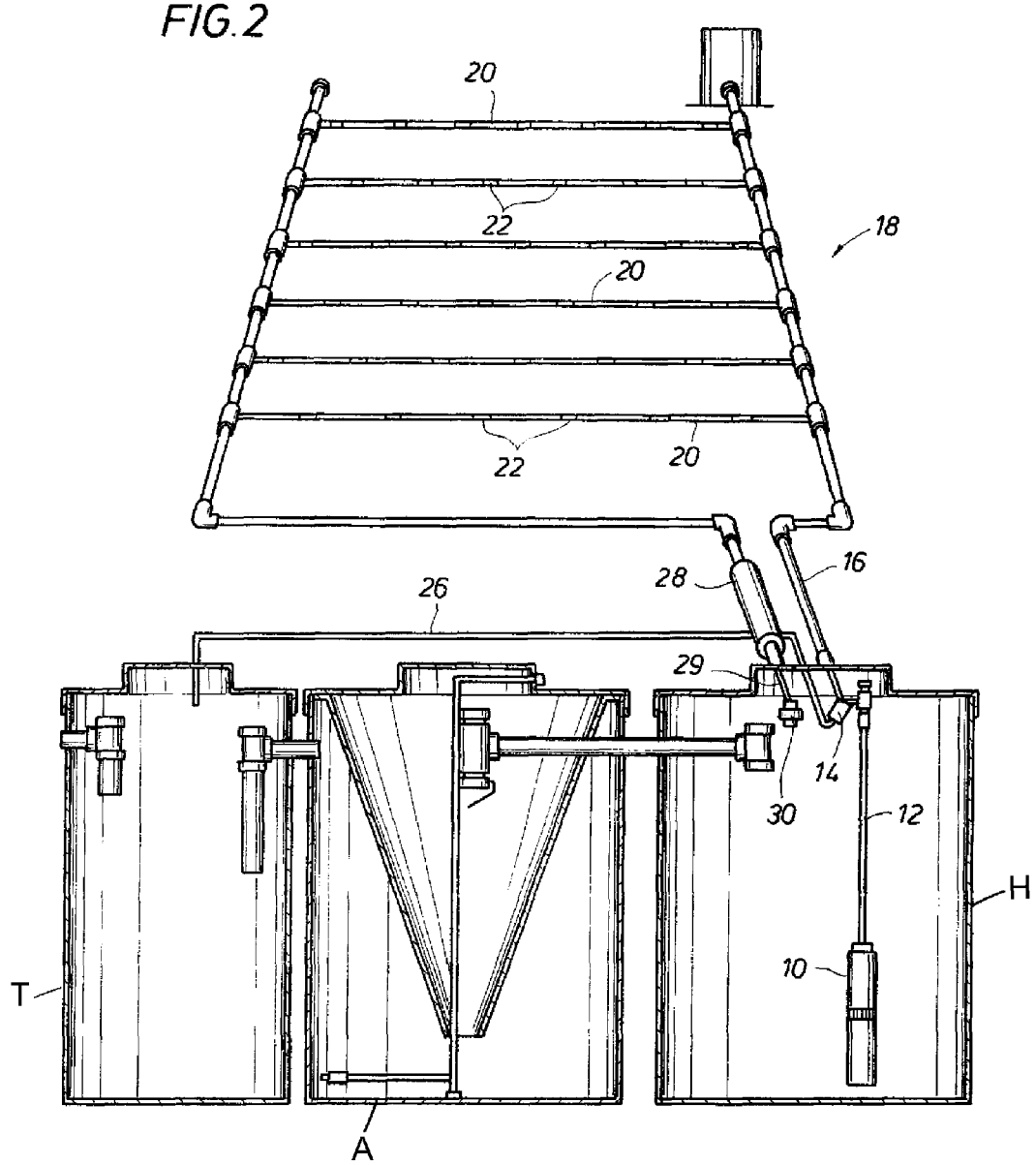
FIG. 2 is a drawing similar to FIG. 1, showing one embodiment of the present invention.

Referring now to FIG. 2, there is shown yet another embodiment of the present invention. In the embodiment previously described in FIG. 3, excessive recycle of water through the AWWS was minimized by virtue of the fact that a controlled amount of water was used to flush filter 14 via canister 28 and flush valve 30. In the embodiment of FIG. 2, excessive flow of return water through the AWWS is achieved by virtue of a controlled volume of water being used to flush lines 20 in the drip irrigation system to ensure that emitters 22 are clean. As can be seen, the embodiment shown in FIG. 2 differs from that shown in FIGS. 2 and 3 in that accumulator 28 is connected to the footer manifold 23, which in turn is connected to flush valve 30 via line 29, flush valve 30 being disposed in pump tank H. Thus, when pump 10 is actuated, filter 14 will be backwashed as described above. However, water return from the drip irrigation system 18 will build up in accumulator 28, so long as pump 10 is running. The build up of water in accumulator 28 will exert a pressure against flush valve 30 moving flush valve 30 to the closed position, and preventing flow of water out of the drip irrigation system 18 and into pump tank H. However, when pump 10 is deactivated and pressure in the accumulator 28 relieved, valve 30 will now move to the normally open position, and the water in accumulator 28 will dump in to pump tank T. Although not shown, a footer control assembly 24 could also be used in the embodiment shown in FIG. 2, assembly 24 being disposed between the outlet of accumulator 28 and flush valve 30. Again, control assembly 24 is used to ensure that there is sufficient pressure in the lines 20 to clean emitters 22. In any event, a controlled amount of water will be used to flush lines 20 and clean emitters 22.

Figure 6:
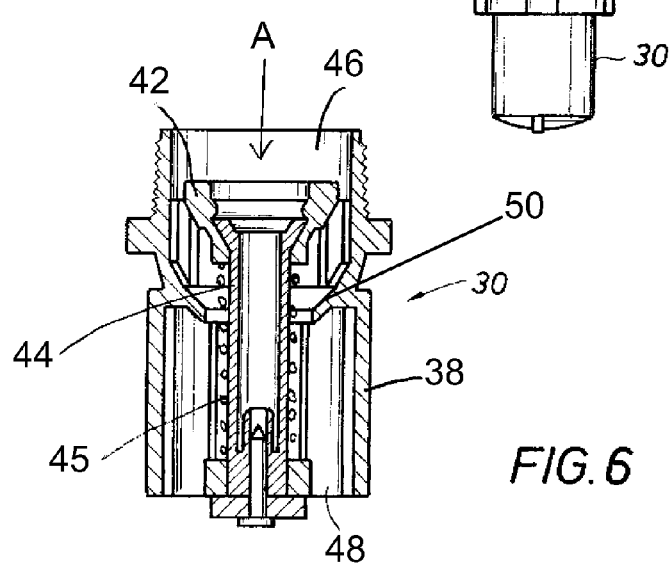
FIG. 6 is an elevational view, partly in section, of one type of flush valve that can be used in the apparatus of the present invention.

With reference to FIG. 6, there is shown a cross-sectional view of one type of flush valve that can be used in the present invention. Flush valve 30 shown in FIG. 6 is of the normally open type and is not moved to the closed position until pressure actuated. As seen in FIG. 6, valve 30 is of the spring operated type and has a body 38 in which is disposed a valve element 42 connected to a valve stem 44, a spring 45 being in surrounding rotationably to stem 44. Valve 30 is normally open. In this regard, water entering valve 30 through inlet 46 would easily flow past valve element 42 to the outlet 48 of valve 30. Positioned in body 38 is a valve seat 50. Spring 45 normally biases valve element 42 to the position shown in FIG. 6; i.e., to the normally open position. However, when sufficient pressure is exerted in the direction of arrow A toward valve element 42, valve element 42 will move down against the force of spring 45 until the valve element engages seat 50. At this point, further flow through the valve is prohibited. Once pressure is relieved, spring 45 moves valve element 42 back to the position shown in FIG. 6 and allows free flow through valve 30. A suitable spring operated automatic flush valve such as valve 30 shown in FIG. 6 is available from Aquarius Brands, Inc.

It will be understood that other types of pressure actuated valves can be used as a flush valve. For example, the flush valve used in the present invention could be of a type where a ball or other valve element is moved by fluid pressure to seat against a suitable valve seat and close the valve. Still other types of automatic, pressure-actuated flush valves that might be employed could include diaphragms as valve elements. It will be understood that in the apparatus of the present invention, the pressure actuated flush valves of the present invention are those which typically require relatively low pressure to move from the normally open to the closed position. Thus, any relatively low pressure actuated valve which has a normally open position, and which can be moved to the closed position by pressure can be employed.

Thus, as can be seen, the apparatus of the present invention can control the volume through the AWWS or for that matter, other septic systems either by using a predetermined amount of water to back flush the filter or to clean the drain line and emitters in the drip irrigation system.

It will also be appreciated that the systems shown in FIGS. 2 and 3 could be combined in the sense that an accumulator 28/valve 30 could be used both in the manner shown in FIGS. 2 and 3. Thus, the amount of back flush water to clean the filter which is being recycled to the system would be controlled as well as the amount of water being used to clean the drip lines and the emitters.

Figure 4:
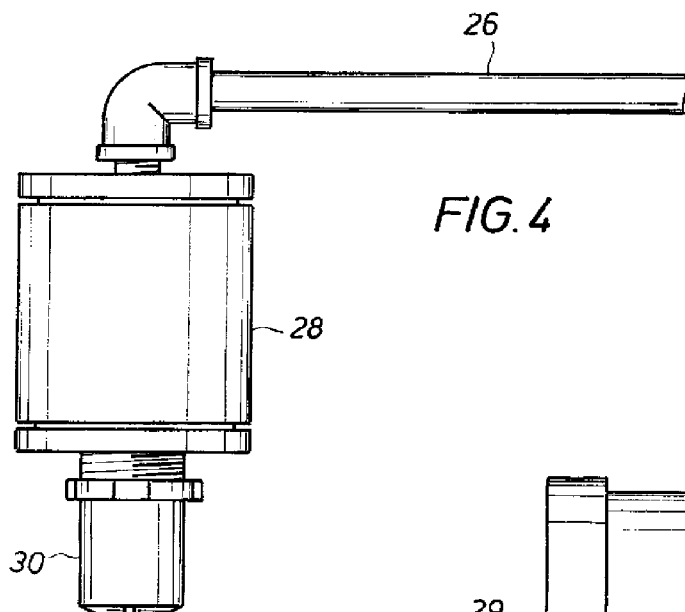
FIG. 4 shows one embodiment of the accumulator/flush valve that can be used in the apparatus of the present invention.
Figure 5:
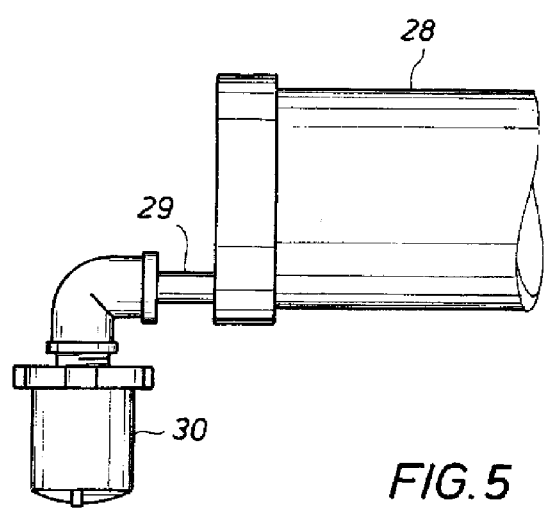
FIG. 5 is a view similar to FIG. 4 but showing another embodiment of the accumulator/flush valve that can be used in the apparatus of the present invention.

FIG. 4 shows a typical arrangement of accumulator 28/valve 30 which could be used in the embodiment of FIG. 3, while FIG. 5 shows a typical arrangement of accumulator 28/valve 30, which could be used in the embodiment of FIG. 3, both embodiments employing a suitable elbow connection between line 26 and accumulators 28. As shown in FIGS. 4 and 5, the accumulators can take the form of canisters having suitable inlets and outlets.

While in the embodiment shown above, the flush valve 30 has been shown in conjunction, when used to control flow to back flush filter 14 with the use of a SPIN CLEAN®, it is to be understood, as noted above, that other types of filters such as disc filters, sand filters, etc., could be employed. Additionally, with reference to the '038 Patent noted above, a combination of accumulator 28 and flush valve 30 could be substituted for the orifice plates 26 and 32 in FIGS. 1 and 2 of the '038 Patent, or for control valves 50 and 52 shown in the embodiments of FIGS. 5 and 6 of the '038 Patent. Further, accumulator 28 and flush valve 30 could be substituted for the control valve shown in FIGS. 7, 8 and 9, such valves being referred to as items 72 and 74 in FIGS. 8 and 9 of the '038 Patent.

It will be appreciated that while in the embodiment shown in FIG. 3, the unfiltered water from filter 14 is returned to the pretreatment tank T, the system could be set up such that accumulator/valve assembly 28/30 dumped water in tank A or for that matter, tank H.

It should be noted that some regulatory agencies which have authority over septic systems require that to adequately flush the drip lines and emitters in a drip irrigation system, a minimum flow rate or flow velocity must be used. It will be appreciated that the accumulators used can be sized to ensure that a desired flow rate is achieved and in this regard, it may be desirable to employ an accumulator having variable volumes, such that the volume of the accumulator can be adjusted to achieve the minimum flow rate.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described are exemplary, and various other substitutions, alterations and modifications, including but not limited to those design alternatives specifically discussed herein, may be made in the practice of the invention without departing from its scope.

What is claimed is:

1. An apparatus for use in a septic system connected to a drip irrigation system for dispensing wastewater from said septic system comprising:
    a pump having a pump outlet for pumping treated wastewater from said septic system;
    a filter connected to said pump outlet, said filter having a first output for directing filtered water to said drip irrigation system, and a second output for disposal of backwash water;
    an accumulator having a pre-determined volume for receiving water from at least one of said drip irrigation system and said second output, said accumulator having an outlet; and
    a pressure actuated, normally open flush valve connected to the outlet of said accumulator, said flush valve closing in response to pressure from water in said accumulator, said valve moving to said normally open position in response to deactivation of said pump.

2. The apparatus of claim 1, wherein said septic system comprises an aerobic wastewater treatment system.

3. The apparatus of claim 1, wherein said flush valve is of the spring biased type.

4. The apparatus of claim 1, wherein said accumulator is connected to a return line of said drip irrigation system.

5. The apparatus of claim 1, wherein said accumulator is connected to the said second outlet of said filter.

6. The apparatus of claim 1, wherein said accumulator comprises a canister having an inlet.

\* \* \* \* \*